MOTOR DRIVEN TUNING SYSTEM

Filed May 10, 1967 2 Sheets-Sheet 1

INVENTOR
WARREN FRANCIS FERRIS

BY

Darby & Darby
ATTORNEYS

Dec. 22, 1970 W. F. FERRIS 3,549,975

MOTOR DRIVEN TUNING SYSTEM

Filed May 10, 1967 2 Sheets-Sheet 2

INVENTOR
WARREN FRANCIS FERRIS

BY

Darby & Darby
ATTORNEYS 3,549,975

MOTOR DRIVEN TUNING SYSTEM

Warren Francis Ferris, Iselin, N.J., assignor to National Union Electric Corporation, Jersey City, N.J., a corporation of Delaware Filed May 10, 1967, Ser. No. 637,429
Int. Cl. H02p 3/00
U.S. Cl. 318—480 10 Claims

ABSTRACT OF THE DISCLOSURE

An apparatus for controlling the angular displacement of a rotating control shaft. A series of arms corresponding to preselected and adjusted angular displacements of a control shaft are mounted radially on a control shaft and sequentially intersect a light beam which strikes a light-dependent resistor. An electric motor is responsive to the output of the light-dependent resistor and revolves the control shaft until the light beam is interrupted by an arm causing the motor to stop. This invention is particularly adapted for use with a UHF television tuner of the type having a revolving control shaft.

This application relates to apparatus for repeatedly and accurately selecting the angular disposition of a control shaft, in particular the angular disposition of a control shaft for a UHF television tuner.

It is often necessary in using electrical or mechanical equipment to set a control shaft at a preselected angular disposition with a high degree of accuracy and repeatability. Further it is often required that the equipment for setting the angular position of the control shaft be capable of setting the shaft in a number of such preselected positions. It is also desirable to accomplish such setting by means of a motor in the case of equipment having a high torque resistance to movement of the control shaft or where it is desirable to operate the control shaft remotely from its location.

A particular problem arises in the use of UHF television tuners due to the fact that the UHF television band is composed of a large number of separate transmitting frequencies closely spaced in the broadcast spectrum. The close spacing of the channels requires accurate tuning to prevent interference between the channels and to prevent skip-over of a channel during tuning. Previous methods of tuning UHF receivers have been both costly and subject to inaccuracies when repeatability of the selected channel is desired. The prior methods require, once gross selection of a channel has occurred, that the operator manually perform fine tuning on the particular channel to achieve a satisfactory picture.

The prior methods of achieving a preselected angular disposition of a control shaft have used mechanical arrangements of gears, cams, levers, etc. These methods are costly, complicated, and difficult to adjust. The mechanical couplings used in such systems introduce error into the adjustment and reduce the repeatability obtainable. In order to achieve any success with a mechanical system, an extremely high degree of precision must be used in the manufacture and assembly of the system and its components. Further, as parts wear, inaccuracies start to occur in the system and the inaccuracy increases as more usage occurs.

The present invention eliminates the problems of the prior methods and apparatus for controlling the angular disposition of a control shaft and in particular allows speedy, accurate tuning of a preselected television channel on a UHF tuner at the television set or remotely. In order to accomplish the objects of this invention a light-responsive detector, such as a light-dependent resistor (LDR) is used as part of a drive motor control circuit. A number of angularly adjustable arm elements are carried by a shaft of the tuner, which is rotated by a drive motor and are located to pass between a light source and the LDR so that each arm can block off the light source from the light-responsive detector. The LDR operates through an amplifier circuit to control the motor so that when the LDR is blocked off from the light source by an arm, the motor will stop thereby orienting the control shaft at the angular disposition previously selected. When it is desired to move the shaft to the next selected position it is only necessary to momentarily activate the motor thereby moving the arm out of its blocking position in front of the LDR and allowing the light to strike the LDR. The motor is thereby activated until the LDR is once again blocked from its light source by the next arm.

My invention eliminates the difficulties associated with the prior mechanical systems. The means for adjustment of the tuning system is extremely simple, resulting in low labor costs for initial adjustment. The tuning system repeats cycles with a high degree of accuracy and the system requires little maintenance and upkeep during the life of the television receiver. Further, precision in the manufacturing of the parts and assembly is not critical, thereby reducing the cost of the system below that of prior mechanical systems, and increasing the speed attainable in the assembly of the system.

The invention will be described in greater detail below and in the drawings in which.

Figures 1, 2, 3, 4:
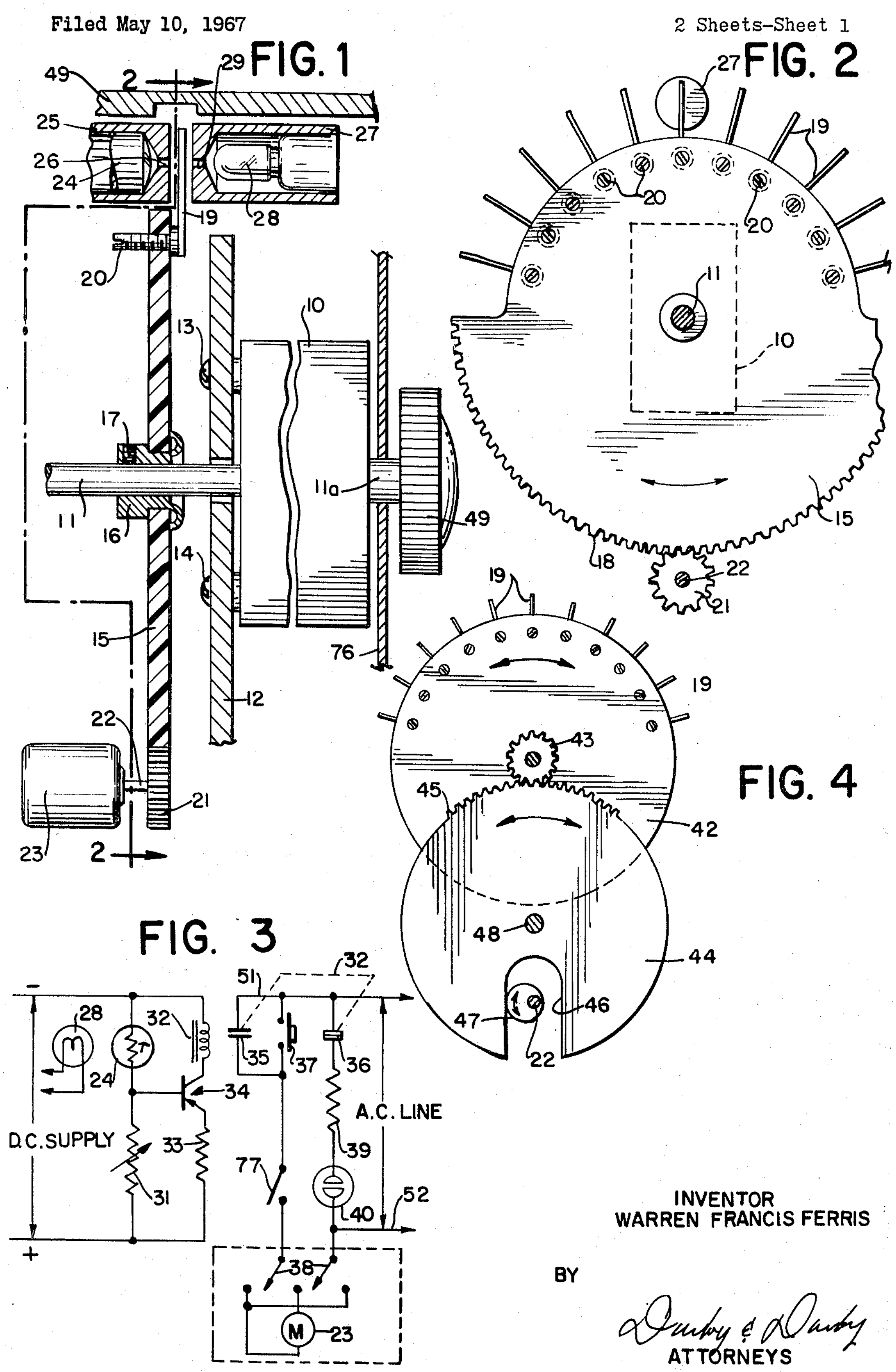
FIG. 1 is a partial cross-section of a portion of the mechanism of the control shaft orienting mechanism.
FIG. 2 is a front view of the programming disk.
FIG. 3 is a schematic view of the electrical circuit controlling the orienting mechanism.
FIG. 4 is a front view showing alternative apparatus for reversing the rotation of the tuner.

Referring to FIG. 1, a conventional UHF tuner 10, is mounted on an interior mounting wall 12 within the television set (not shown), by means of screws 13 and 14. The tuner 10 contains a single rotatable tuning shaft having two ends 11 and 11a which passes out of both ends of the tuner. Tuner 10 contains the usual electrical components and is arranged so that rotation of the shaft ends 11 or 11a sequentially tunes each of the available UHF channels. Shaft 11a passes through the front wall 76 of the television set and has a knob 49 affixed to it.

Affixed to shaft 11 is a program disk 15. A bushing 16 is located at the center of disk 15 and is provided with a set screw 17. The set screw 17 holds the disk and bushing on the shaft and allows adjustment of disk 15 relative to shaft 11. As shown in FIG. 2, approximately half of disk 15 is provided with a series of projecting arms 19 of opaque material. Each of the arms 19 is adjustably mounted to allow angular rotation in a plane parallel to the plane of the disk around the axis of its corresponding mounting screw 20. Arms 19 may be made of wire or a flat strip having a cross-section of approximately .025 inch in a plane parallel to the plane of the disk.

A hollow housing 25 is mounted to the television chassis so that each of the arms 19 sequentially passes across its face during rotation of the tuning shaft 11. Housing 25 is provided with an aperture 26 which is of the same width as arms 19, so that at some point in the rotation of disk 15 each of the arms 19 can completely cover aperture 26.

Located within housing 25 is a light-dependent resistor 24 which will be described in greater detail below. The light-dependent resistor is connected to an electrical circuit that will also be described below.

Opposite housing 25 is a second housing 27. Housing 27 is also affixed to the chassis and is provided with an aperture 29. An incandescent light source 28 is located inside housing 27. Aperture 29 on housing 27 and aperture 26 on housing 25 are aligned so that a beam of light produced by lamp 28 is directed at the active face of the LDR. The beam of light thus created is identical in width to arms 19. Alignment of the two housings is insured by a common holder 49 which supports and aligns both housings and to which both housings are secured during assembly.

Programming disk 15 is further provided with gear teeth 18 around the portion of its periphery not occupied by arms 19. A motor 23 having a shaft 22 drives a small gear 21 which in turn engages gear teeth 18. The ratio of the diameter of gear 21 to the diameter of programming disk 15 is sufficiently great so as to cause a slow rotation of the programming disk. Motor 23 is provided with conventional means (not shown) such as a solenoid clutch which disengages gear 21 when in an unpowered state to prevent coasting of the disk 15.

Referring to FIG. 3, a conventional relay driving amplifier for controlling drive motor 23, is shown in the left half of the diagram. Light-dependent resistor 24 is connected in series with a variable resistor 31 and across a source of direct current (DC) voltage to form a variable resistance voltage divider. The junction of resistors 24 and 31 is connected to the base of a PNP transistor 34 to provide base bias. The emitter of transistor 34 is biased by a resistor 33. Variable resistor 31 adjusts the sensitivity of the circuit. Once initial adjustment of the circuit is made, it will not normally be necessary to adjust resistor 31 again. The coil of a relay 32 is connected to the collector of the transistor and to the negative side of the DC supply.

As is conventional, the light-dependent resistor 24 is constructed so that as light from lamp 28 strikes its surface its resistance drops. When this occurs, there is maximum voltage drop across the base bias resistor 31, forward biasing transistor 34 to conduction and energizing relay 32. When light is blocked from the LDR 24, by an arm 19 passing in front of aperture 26, the resistance of LDR 24 is maximum causing a minimum voltage drop to be produced across base bias resistor 31. This renders transistor 34 non-conductive and de-energizes relay 32.

Relay 32 operates a set of normally open contacts 35 and a set of normally closed contacts 36. Normally open contacts 35 are connected in one line 51 of a pair of alternating current (AC) power lines connected to motor 23. The other AC line 52 is connected directly to the motor through a reversing switch 38. As can be seen, opening or closing contacts 35 by de-energizing or energizing relay 32 stops or starts the motor when switch 77 is closed. A manual spring-loaded switch 37 is located in parallel with contacts 35 across line 51 so that closure of either switch 37 or energization of relay 32 which closes contact 35, will complete the circuit causing power to flow to motor 23. The other set of relay contacts 36 are connected across the AC power line 51 and 52 in series with a high value current limiting resistor 39 and a neon lamp 40.

As an arm 19 moves away from the blocking position in front of the LDR 24 allowing light to strike the LDR, the resistivity of the LDR drops thereby causing the amplifier of which it is a part to energize relay 32, closing switch 35 and causing motor 23 to commence turning thereby driving the control shaft. At the same time switch 36 is opened causing neon lamp 40 to be extinguished. When the next arm 19 blocks the LDR the resistivity increases to a maximum and the operation is reversed, de-energizing relay 41, causing switch 35 to open, stopping the motor, and switch 36 to close, activating light 40.

A reversing switch 38 is provided in motor 23 and is operable to reverse the direction of rotation of the motor when the end of the UHF band is reached.

As an alternative to the electrical reversal of the motor of FIG. 4, a mechanical reversing mechanism may be employed as shown in FIG. 4. The programming disk 42 is provided with a fixed gear 43 of small diameter affixed to the center of the side of the disk. A second disk 44 pivots around an axis 43 parallel to the axis of disk 42. A segment of the periphery of disk 44 is provided with gear teeth 45 which in turn mesh with gear 43.

A notch 46 is provided in the lower edge of disk 44 and located in the notch is an eccentric cam 47 which is affixed to motor shaft 22. When the eccentric cam is rotated, it presses against one side of notch 46 causing disk 44 to rotate in one direction until the cam strikes the opposite wall of the notch, reversing the direction of the disk. The ratios of the gear and cam are selected to allow full traversing of the entire UHF band width.

In operation, the tuning mechanism is pre-adjusted by manually turning control shaft 11 and programming disk 15 until a desired channel is precisely tuned. The nearest arm 19 is then adjusted by means of screw 20 until it is directly in line with apertures 26 and 29.

The proper tuning of the mechanism and channel will be signaled by the lighting of the neon bulb 40 as the relay is de-energized, closing contacts 36. During the adjustment, motor 23 is completely disengaged by opening switch 77 which is located in the AC power line leading to motor 23. This operation is repeated for each of the channels and arms 19 may be removed where no channel is located. This will leave only those arms 19 which correspond to an actual television channel broadcasting in the location of the television set. Switch 77 is then closed.

Assuming that a channel is tuned and one of the arms 19 covers the aperture 26, preventing light from striking the light-dependent resistor 24, then relay 32 will be de-energized and motor 23 will be inoperative. In order to change channels, switch 37 is momentarily depressed, either manually or by remote control, causing motor 23 to rotate thereby removing the arm 19 blocking aperture 26. The light from the incandescent light 28 will then strike light-dependent resistor 24 thereby causing relay 32 to energize and in turn causing power to flow to motor 23 after switch 37 is released. At the same time switch 36 will open, extinguishing neon light 40.

When the next channel is reached by rotation of disk 15, an arm 19 will again cover aperture 26, preventing light from striking light-dependent resistor 24, causing relay 32 to open switch 35 and motor 23 to stop. At the same time switch 36 will close, activating neon light 40 thereby signalling completion of a tuning operation. Neon light 40 will be continuously illuminated when the mechanism is in operation and a channel is tuned.

The process of channel selection is then repeated until the desired channel is reached. At the end of the arc of travel of the tuner, the motor reverses itself and the cycle is repeated in the opposite direction.

In the event new channels go on the air in the location or the set is moved to a different location, additional arms 19 can be added. Further, during the life of the set, as electrical components age, arms 19 can be periodically adjusted so as to continue to provide accurate tuning.

If it is desired to manually tune the television set, a switch, for example, connected in one side of the AC line may be opened overriding the control circuit of motor 23. Since motor 23 only engages disk 15 when power is applied, no drag will be placed on the tuner, and the knob 49 need only be rotated until the desired station is tuned.

Figure 5:
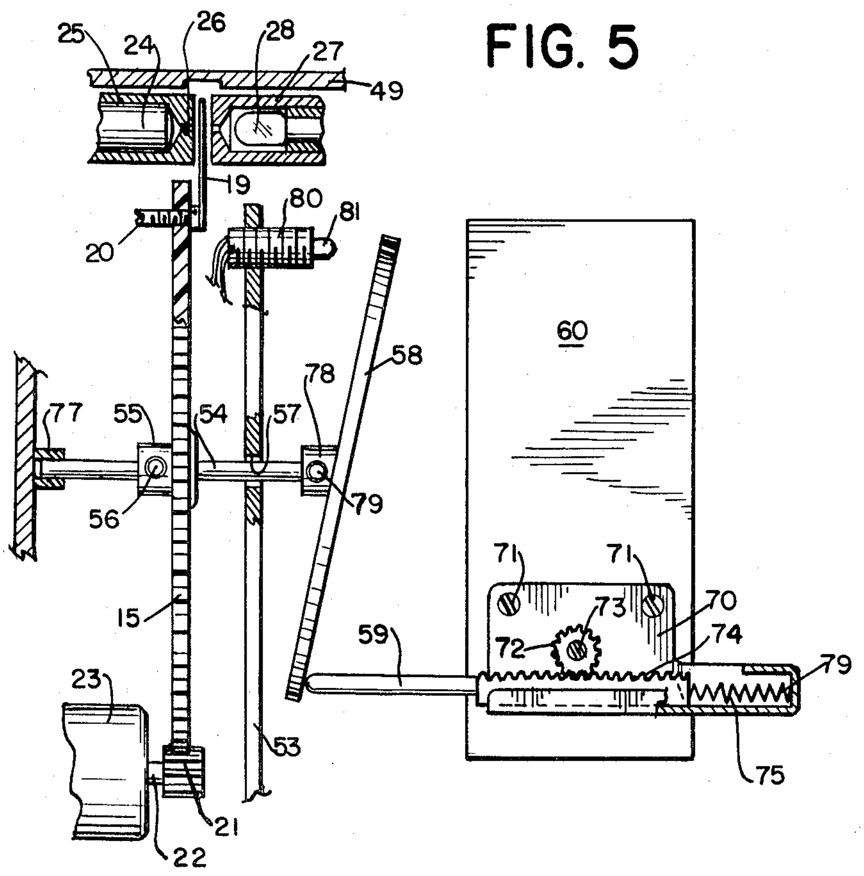
FIG. 5 is a partial cross-section showing alternative apparatus for driving a tuner control shaft.

Referring to FIG. 5, alternative apparatus for driving the tuner 60 is shown. Disk 15 containing extending arms 19, as previously described, is affixed to a rotatable shaft 54 by means of a bushing 55. A set screw 56 fixes the bushing and disk relative to shaft 54. Shaft 54 is provided with a bearing 77 at one end and bearing 57 located in wall 53 to retain shaft 54 in a level rotatable position. Disk 15 engages the gear 21 and motor 23 in the same manner as previously described in the first embodiment.

Affixed to one end of shaft 54 is a plate 58. Plate 58 is provided with a fixed bushing 78 at its center which engages shaft 54 and is tipped at an angle relative to the shaft. When shaft 54 rotates, an object held in space against a point on plate 58 will tend to move parallel to shaft 54, inwardly and outwardly. Set screw 79 locks the bushing 78 and plate 58 to the shaft.

Tuner 60 is provided with a rotatable control shaft 73 mounted on the side of the tuner. A supporting bracket 70 is secured to the side of tuner 60 by means of bolts 71. Bracket 70 has an opening (not shown) permitting shaft 73 to pass through it.

Fixed to the end of shaft 73 is a gear 72 which engages the teeth of a movable rack 74. Rack 74 is located by supporting bracket 70 in a pocket 79 formed therein. A spring 75, biases the rack outwardly. Affixed to the outer end of rack 74 is a rod 59 which engages the surface of plate 58.

In operation disk 15 is driven by motor 23 in the same manner as previously described. Similarly the channel selection and setting of arms 19 is also accomplished in the same previously described manner. As disk 15 rotates, shaft 54 also rotates along with plate 58. Due to the fact that plate 58 is tilted relative to shaft 54, its lower edge which is in contact with rod 59 due to the bias of spring 75, will move inwardly and outwardly relative to the rod. Rod 59 will in turn move rack 74 which will rotate gear 72 and in turn tuner control shaft 73.

A limit switch 80 provided with a contact 81 is located opposite rod 59 and when closed by contact with the surface of plate 58 will reverse the operation of motor 23. The operation will then be reversed thereby causing the control shaft 73 to move in the opposite direction.

It is to be understood that the embodiment disclosed herein is exemplary of the invention and is not to be considered limiting. A number of substitutions and arrangements of the operative elements of the invention can be provided to conform to the specific requirements of various types of apparatus having control shafts that rotate or move in a line.

What is claimed is:

1. A control shaft orienting mechanism for use with the tuner of an electronic device, or the like, wherein it is desired to sequentially move such control shaft through a plurality of discrete preselected positions, such positions being adjustable to permit selection of different pluralities of positions, comprising, in combination, a movable control shaft, a plurality of light interrupting means mechanically coupled to said control shaft and corresponding, respectively, to selected positions of said shaft, a fixed light source and fixed light-responsive means located on opposite sides of said light interrupting means for forming a stationary light beam therebetween, motor means for rotating the control shaft and light interrupting means so that successive ones of said light interrupting means pass through said light beam, means for adjusting the placement of selected ones of said light interrupting means so as to prevent interruption of said light beam by said selected ones, and means responsive to interruption of said light beam by any one of said light interrupting means for preventing said shaft moving means from rotating said control shaft thereby positioning the control shaft at the position corresponding to said one light interrupting means, said means for preventing comprising amplifier means coupled to said light-responsive means for controlling the operation of said motor.

2. A control shaft orienting mechanism according to claim 1, further including means to indicate that a selected position has been achieved.

3. A control shaft orienting mechanism according to claim 2, wherein the means to indicate that a selected position has been achieved is a neon bulb, said neon bulb being responsive to the output of the light responsive means.

4. A control shaft orienting mechanism according to claim 1, further including means for reversing the direction of operation of the means for rotating the control shaft.

5. A control shaft orienting mechanism according to claim 4, wherein said reversing means comprises a second rotatable shaft, a gear having a notch in a portion of its periphery affixed to said second shaft, a cam operatively connected to said means for moving the control shaft, said cam engaging said notch to rotate the gear in one direction for part of the revolution of the cam and to rotate the gear in the opposite direction for the completion of a revolution of the cam, and means operatively connected to said gear for rotating the control shaft.

6. A control shaft orienting mechanism according to claim 1, further including in combination, a television tuner, said movable control shaft being operatively connected to said television tuner to tune said tuner.

7. A control shaft orienting mechanism according to claim 1, wherein the means for rotating the control shaft comprises a motor having an output shaft, a gear affixed to the output shaft of said motor, a second rotatable shaft parallel to the output shaft of said motor and having mounted thereon said light interrupting means, a gear affixed to said second shaft and in engagement with the output gear of said motor, a plate affixed to said second shaft and oriented at an angle relative to the center line of said shaft, a rack having thereon gear teeth in operative engagement with said plate so as to move parallel to the center line of said second shaft when said plate rotates and a gear affixed to said control shaft in operative connection with said rack.

8. A control shaft orienting mechanism according to claim 1, wherein the angular position of each of said light interrupting means is adjustable relative to the control shaft to initially select positions of said shaft.

9. A control shaft orienting mechanism according to claim 1, wherein the light-responsive means is a light-dependent resistor whose resistance is a function of the amount of light received from said light beam.

10. A control shaft orienting mechanism according to claim 9, wherein the light-dependent resistor causes said means for controlling said means for rotating the control shaft to operate when the light beam strikes its surface and causes said means for controlling the means for rotating the control shaft to cease operating when the light beam is interrupted.

References Cited

UNITED STATES PATENTS

| | | | |
|---|---|---|---|
| 2,520,749 | 8/1950 | Ware | 318—265X |
| 2,522,264 | 9/1950 | Haase | 318—265X |
| 2,571,197 | 10/1951 | Buss | 318—265X |
| 2,818,538 | 12/1957 | Kamen et al. | 318—480X |

ORIS L. RADER, Primary Examiner

A. G. COLLINS, Assistant Examiner

U.S. Cl. X.R.

318—265, 466